US009003466B2

(12) United States Patent
Singh et al.

(10) Patent No.: US 9,003,466 B2
(45) Date of Patent: Apr. 7, 2015

(54) METHOD AND SYSTEM FOR ISOCHRONOUS DATA STREAM MANAGEMENT IN HIGH SPEED AUDIO/VIDEO NETWORKS

(75) Inventors: Harkirat Singh, Santa Clara, CA (US); Ilju Na, Suwon (KR); Jae Min Lee, Suwon (KR); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 510 days.

(21) Appl. No.: 13/091,019

(22) Filed: Apr. 20, 2011

(65) Prior Publication Data

US 2011/0265137 A1    Oct. 27, 2011

Related U.S. Application Data

(60) Provisional application No. 61/326,961, filed on Apr. 22, 2010.

(51) Int. Cl.
*H04N 7/173* (2011.01)
*H04N 21/2381* (2011.01)
(Continued)

(52) U.S. Cl.
CPC ....... *H04N 21/2381* (2013.01); *H04N 21/4381* (2013.01); *H04N 21/643* (2013.01)

(58) Field of Classification Search
CPC ............ H04N 7/17318; H04N 21/235; H04N 21/2381; H04N 21/4381; H04N 21/643
USPC ....................................................... 725/116
See application file for complete search history.

(56) References Cited

U.S. PATENT DOCUMENTS

| 6,925,518 B2 | 8/2005 | Rudland et al. |
| 7,010,607 B1 | 3/2006 | Bunton |

(Continued)

FOREIGN PATENT DOCUMENTS

| KR | 1019980070589 A | 10/1998 |
| KR | 1020000049091 A | 7/2000 |

(Continued)

OTHER PUBLICATIONS

IEEE Computer Society, "IEEE Std 802.1D—2004, IEEE Standard for Local and metropolitan area networks, Media Access Control (MAC) Bridges", IEEE, Jun. 9, 2004, pp. i-269.*

(Continued)

*Primary Examiner* — Nathan Flynn
*Assistant Examiner* — Alfonso Castro
(74) *Attorney, Agent, or Firm* — Sherman IP LLP; Kenneth L. Sherman; Steven Laut

(57) ABSTRACT

A method and system for isochronous data stream management in high speed audio/video networks. One implementation comprises isochronous communication management between audio/video (AV) devices by maintaining forwarding information for forwarding data between AV devices, wherein each AV device includes multiple I/O ports for connecting the AV device to another AV device via a communication link including multiple communication lanes. The forwarding information is utilized to communicate AV path setup request and response control messages between a source AV device and a destination AV device via said communication link, and allocating isochronous communication resources for AV data streaming, for establishing AV path streams for bi-directional isochronous AV data streaming between the source and destination AV devices.

52 Claims, 11 Drawing Sheets

(51) Int. Cl.
*H04N 21/438* (2011.01)
*H04N 21/643* (2011.01)

(56) References Cited

U.S. PATENT DOCUMENTS

| | | | |
|---|---|---|---|
| 7,277,402 B2 | 10/2007 | Legallais et al. | |
| 7,574,550 B2 * | 8/2009 | Feng | 710/311 |
| 7,835,374 B2 | 11/2010 | Diab et al. | |
| 8,259,761 B2 * | 9/2012 | Diab et al. | 370/535 |
| 8,566,473 B2 | 10/2013 | Ajanovic et al. | |
| 2004/0088469 A1 * | 5/2004 | Levy | 710/316 |
| 2008/0037589 A1 | 2/2008 | Kliger et al. | |
| 2008/0089321 A1 * | 4/2008 | Arulappan et al. | 370/386 |
| 2008/0219176 A1 | 9/2008 | Yamada | |
| 2009/0010253 A1 * | 1/2009 | Kobayashi | 370/389 |
| 2009/0207866 A1 | 8/2009 | Cholas et al. | |
| 2010/0214906 A9 | 8/2010 | Diab et al. | |
| 2011/0261823 A1 | 10/2011 | Singh et al. | |
| 2011/0265139 A1 | 10/2011 | Singh et al. | |
| 2012/0151537 A1 | 6/2012 | Singh et al. | |

FOREIGN PATENT DOCUMENTS

| | | | |
|---|---|---|---|
| KR | 1020000052547 A | 8/2000 | |
| KR | 1020010080608 A | 8/2001 | |
| KR | 1020020018970 A | 3/2002 | |
| KR | 1020060033445 A | 4/2006 | |
| KR | 1020070073556 A | 7/2007 | |

OTHER PUBLICATIONS

International Search Report and Written Opinion dated Dec. 27, 2011 for International Application No. PCT/KR2011/003469 from Korean Intellectual Property Office, pp. 1-10, Seo-gu, Daejeon, Republic of Korea.

International Search Report and Written Opinion dated Jan. 19, 2012 for International Application No. PCT/KR2011/003753 from Korean Intellectual Property Office, pp. 1-8, Seo-gu, Daejeon, Republic of Korea.

IEEE Computer Society, "IEEE Std 802.1D™—2004, IEEE Standard for Local and metropolitan area networks, Media Access Control (MAC) Bridges", IEEE, Jun. 9, 2004, pp. i-269, New York, United States.

IEEE Computer Society, "IEEE Std 802.15.3c™—2009, IEEE Standard for Information technology—Telecommunications and information exchange between systems—Local and metropolitan area networks—Specific requirements, Part 15.3: Wireless Medium Access Control (MAC) and Physical Layer (PHY) Specifications for High Rate Wireless Personal Area Networks (WPANs), Amendment 2: Millimeter-wave-based Alternative Physical Layer Extension", IEEE, Oct. 12, 2009, pp. i-187, New York, United States.

IEEE Computer Society, "IEEE Std 802.11n™—2009, IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput", IEEE, Oct. 29, 2009, pp. i-502, New York, United States.

International Search Report and Written Opinion dated Jul. 31, 2012 for International Application No. PCT/KR2011/009618 from Korean Intellectual Property Office, pp. 1-8, Seo-gu, Daejeon, Republic of Korea.

U.S. Non-Final Office Action for U.S. Appl. No. 13/103,949 mailed Sep. 12, 2013.

U.S. Non-Final Office Action for U.S. Appl. No. 13/112,973 mailed Nov. 20, 2013.

U.S. Final Office Action for U.S. Appl. No. 13/103,949 mailed Apr. 9, 2014.

U.S. Final Office Action for U.S. Appl. No. 13/112,973 mailed Jun. 4, 2014.

U.S. Non-Final Office Action for U.S. Appl. No. 13/103,949 mailed Jul. 31, 2014.

U.S. Advisory Action for U.S. Appl. No. 13/112,973 mailed Aug. 27, 2014.

U.S. Advisory Action for U.S. Appl. No. 13/103,949 mailed Jun. 18, 2014.

Video Electronics Standards Association (VESA), "Proposed VESA DisplayPort Standard, Version 1.2, Draft 11", VESA, Dec. 23, 2009, pp. 1, 41-43, and 157-160, United States.

DiiVA, "DiiVA Specification 1.1 (Beta)", DiiVA Promoters Group, Dec. 1, 2009, pp. 1, 46-48, and 52-57, United States.

U.S. Notice of Allowance for U.S. Appl. No. 13/103,949 mailed Nov. 13, 2014.

\* cited by examiner

METHOD AND SYSTEM FOR ISOCHRONOUS DATA STREAM MANAGEMENT IN HIGH SPEED AUDIO/VIDEO NETWORKS

RELATED APPLICATION

This application claims priority from U.S. Provisional Patent Application Ser. No. 61/326,961, filed on Apr. 22, 2010, incorporated herein by reference.

FIELD OF THE INVENTION

The present invention relates in general to video transmission, and in particular, to isochronous video stream management in a high speed video network.

BACKGROUND OF THE INVENTION

Increasing quantity of multimedia content, and specifically high quality multimedia content, presents a number of communication and processing challenges to designers and administrators of computing platforms and networks alike. Video Electronics Standards Association (VESA), Digital Interactive Interface for Video and Audio (DiiVA), and HDBaseT Alliance provide industry-wide interface standards directed to unidirectional transport of high quality multimedia data between two electronic devices.

BRIEF SUMMARY OF THE INVENTION

A method and system for isochronous data stream management in high speed audio/video networks. One embodiment comprises isochronous communication management between audio/video (AV) devices by maintaining forwarding information for forwarding data between AV devices. Each AV device includes multiple input/output (I/O) ports for connecting the AV device to another AV device via a communication link including multiple communication lanes. The forwarding information is utilized to communicate AV path set-up request and response control messages between a source AV device and a destination AV device, and allocating isochronous communication resources for AV data streaming, for establishing AV path streams for bi-directional isochronous AV data streaming between the source and destination AV devices.

These and other features, aspects and advantages of the present invention will become understood with reference to the following description, appended claims and accompanying figures.

DESCRIPTION OF THE INVENTION

Figure 1:
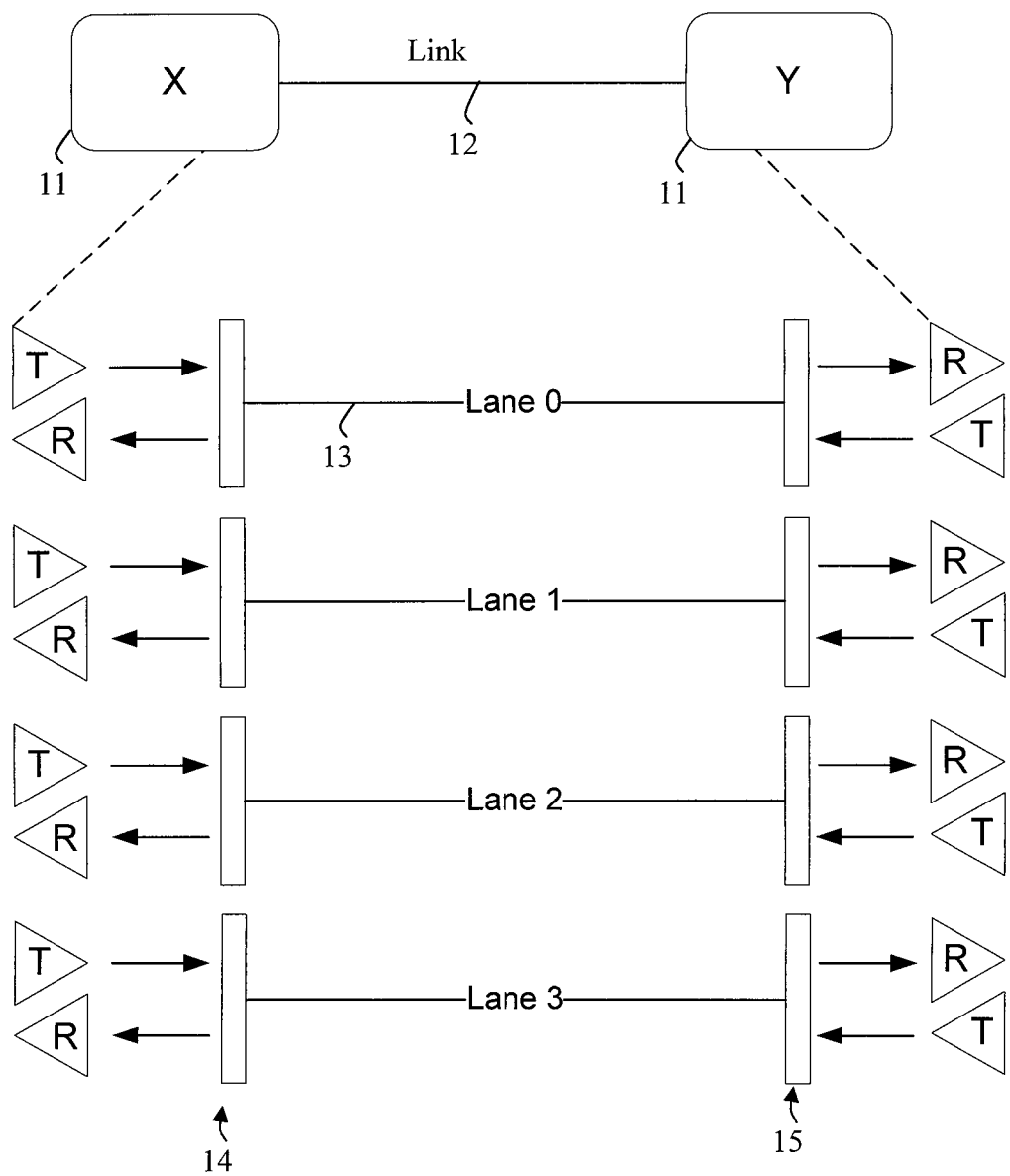
FIG. 1 shows a block diagram of a network of AV devices including a source audio/video (AV) device and a destination AV device, implementing isochronous data stream management for audio/video data communication, according to an embodiment of the invention.

Embodiments of the invention provide a method and system for isochronous data stream management in multimedia networks such as high speed video networks comprising multiple AV electronic devices. Embodiments of the invention further provide support for bi-directional transport of multimedia data comprising video data using a video path setup scheme.

According to an embodiment of the invention, a forwarding table at each AV device is used to forward control messages including video path setup requests, and response messages, from a video source AV device to a video sink AV device. The video path setup requests are for allocation of isochronous communication resources such as lanes, their direction of data flow and symbols (or allocated channel time duration) on the selected lanes. Said isochronous resources are tracked in the forwarding table.

According to an embodiment of the invention, the port and lane for forwarding of a received control message is determined as needed, whereby a dedicated lane is not required for exchange of control messages. An allocation process reserves ports, lanes, and allocated channel time duration (or symbols) on the corresponding lanes. A port includes multiple lanes wherein a forwarding table entry for a particular destination device is in the form of a tuple of (port, lane). Lane assignment is dynamic and there is no dedicated port assigned for data/control communication. As such, the forwarding table includes the number of lane(s) over which data (e.g., packets) are communicated.

According to an embodiment of the invention, a device that is capable of supporting high speed video maintains forwarding information about the port and lane to which a control message, such as a video stream path setup request, should be transmitted on to reach a destination device. The forwarding information may be included as an array in the transmitted control message. The forwarding information may also be maintained in a forwarding table. In one embodiment, a device that is capable of supporting high speed video maintains a forwarding table for isochronous resource allocation including information about the video stream, port number, lane numbers, and channel time unit (or symbols) on the corresponding lane.

A dedicated channel for transmission of control messages is not required. A few port lanes may be selectively used in one direction such that the other remaining lanes on the port may be enabled in a different direction, wherein bi-directional flow of video content within a port is enabled.

According to an example implementation of the invention, a high-speed multimedia interface includes multiple ports. Each port may comprise, for example, one or more twisted pairs or lanes (e.g., physical data communication link or medium). In one example, the number of twisted pairs is fixed to four. Each interface may provide a physical connection to enable bi-directional communication of multimedia traffic (compressed and uncompressed AV), control data and bulk data traffic.

FIG. 1 shows a block diagram of a wired video network 10 comprising AV devices 11 (i.e., device X and device Y) connected via a wired communication link 12, according to an embodiment of the invention. The link 12 includes four physical lanes 13 (i.e., Lane 0, . . . , Lane 3) available on a port 14 of device X to a port 15 of device Y. In one example, each lane 13 can be configured either in Transmit (T) mode or in Receive (R) mode. In another example, each lane 13 may be in the T or R mode per packet basis, involving frequent mode changes of the physical (PHY) layer of each device.

An implementation of the first mode wherein each lane 13 can be configured either in Transmit (T) mode or in Receive (R) mode, is described hereinbelow, according to an embodiment of the invention.

Bi-Directional Uncompressed Video and Audio Streaming

An example application of said high-speed multimedia is to bi-directionally transmit uncompressed video and audio data from a video source device (e.g., a DVD player) to a video sink device (e.g., a display device such as a television (TV)). In one embodiment of the invention, each lane 13 in FIG. 1 may support 5 Gbps, and total 20 Gbps for data communication over the four lanes. In order to provide bi-directional communication, at most 15 Gbps can be supported in one direction. In one example, video data can have a pixel size of 18, 24, 30, 36, or 48 bits, and video resolution supports VGA (640×480) to 1080 p (1920×1080) depending on the display capabilities of the sink device.

In one embodiment, the network 10 in FIG. 1 comprises a switched network that provide bi-directional support for AV streaming such that two out of the four lanes 13 are dynamically configured in the T mode and the other two lanes 13 are configured in the R mode such that simultaneous transmission of AV data between the devices X and Y is enabled. In one embodiment, in a multi-hop scenario such as illustrated by a switched network 20 of serially connected AV devices 11 shown in FIG. 2, there may be one or more switched AV bridge devices 11 connected to the source and sink AV devices 11, wherein both video and audio data from a source device are allowed to pass through the bridge devices 11 before reaching the sink device.

Bulk Data Transfer

In FIG. 1, the lanes 13 used for transferring AV information may also be used for transferring large data files from the source device X to the sink device Y (e.g., destination device). This is achieved by multiplexing AV, control, and data over the lanes 13. For bulk data, USB or Ethernet data packets can be sent directly through the lanes 13. When USB or Ethernet protocol is not available, an application can send data as a generic data packet as well.

Port, Lane, and Channel Time Allocation

Figure 2:
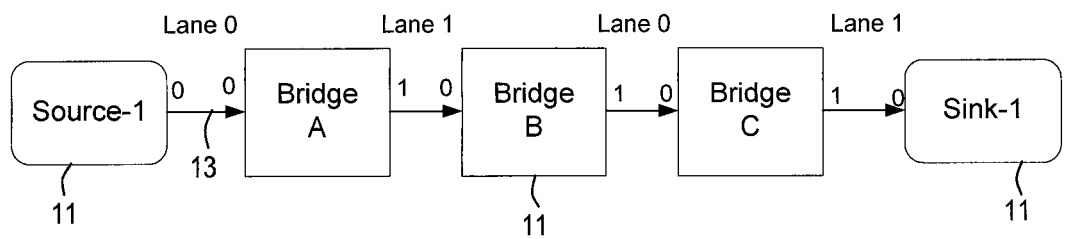
FIG. 2 shows a block diagram of a network of AV devices including a source AV device, one or more bridge AV devices and a destination AV device, implementing isochronous data stream management for audio/video data communication by forwarding control messages from the source AV device to the sink (destination) AV device, according to an embodiment of the invention.

According to an embodiment of the invention, in a multi-hop scenario shown in FIG. 2, before a video data transmission is started, the source and the sink devices 11 negotiate using control messages including allocation messages for port, lane, and symbol time allocation (i.e., time unit or channel time allocation on a lane). The control messages are transmitted on the lanes 13 that are already assigned for the source and the sink devices for transmission of such control messages. In general, other information (e.g., frames/packets including compressed AV, Ethernet/USB frames, management frames, layer 3 (e.g., FIG. 5B), and higher layer packets) may follow similar transmission rules as said control messages.

According to an embodiment of the invention, a layer 2 forwarding table 11E (FIG. 5B) includes two sub-tables: data/control forwarding sub-table and audio/video forwarding sub-table (hereinafter video forwarding sub-table). The data/control forwarding sub-table includes information for forwarding of data/control information (data/control packets), and the video forwarding sub-table includes information for forwarding of audio/video data (e.g., uncompressed video data and audio data packets).

According to an embodiment of the invention, a forwarding table is constructed based on transparent bridging, namely forwarding, filtering, and flooding. In the AV network, an AV device discovers other devices that are reachable on a port by promiscuous listening. Because an AV device uses separate lanes for T and R modes, a different lane is used for transmission of its own frame than the lane used by a nearby AV device for the transmission of its frame. For a destination AV device that does not have an entry in the forwarding table, the received frame is forwarded on all other ports except the incoming port. In one embodiment, one lane is selected for the frame transmission out of several available lanes on a port. Each entry in the forwarding table may have a timer to age the entry and then to delete it from the forwarding table.

The video forwarding sub-table is dynamically updated based on control messages (e.g. video path setup request/response control messages), wherein the AV devices access their respective forwarding tables for AV data transmission. An AV forwarding table is dynamically updated based on control messages, wherein the AV devices access their respective data/control forwarding sub-tables for transmission of the AV data.

Data and Control Message Forwarding

According to an embodiment of the invention, two options for data/control message forwarding are provided as described below.

Option 1: Array of Forwarding Port and Lane

According to Option 1, each control message includes an array of address fields wherein each address field includes a combination of port number and the lane number within the port, such as illustrated by Table 1 below.

TABLE 1

Array of Port and Lane Numbers

| Array Field 0 | | Array Field 1 | | Array Field 2 | | Array Field 3 | |
|---|---|---|---|---|---|---|---|
| Outbound Port | Lane number on the Port | Outbound Port | Lane number on the Port | Outbound Port | Lane number on the Port | Outbound Port | Lane number on the Port |
| 0 | 0 | 1 | 1 | 1 | 0 | 1 | 1 |

An AV device accesses the array in order to determine the port and lane for transmitting a control message. FIG. 2 shows an example control message flow from a source device Source-1 to a sink device Sink-1, wherein each port has at most four lanes. FIG. 2 illustrates information about outbound port, inbound port, and lane number within each port, wherein such information is included in the array of address fields. The example array of address fields in Table 1 above includes four fields for the considered topology in FIG. 2 when a control message traverses from the Source-1 to Sink-1 via the bridge devices 11 (i.e., Bridge A, Bridge B, Bridge C). Specifically, In Table 1, the Array Field 0 corresponds to Source-1, Array Field 1 corresponds to Bridge A, and so on. By accessing Array Field 0, the device Source-1 is informed that the outbound port is port 0 and the corresponding lane is Lane 0. By accessing Array Field 1, the device Bridge A is informed that the outbound port is port 1 and the corresponding lane is Lane 1. By accessing Array Field 2, the device Bridge B is informed that the outbound port is port 1 and the corresponding lane is Lane 0. By accessing Array Field 3, the device Bridge C is informed that the outbound port is port 1 and the corresponding lane is Lane 1.

Figure 3:
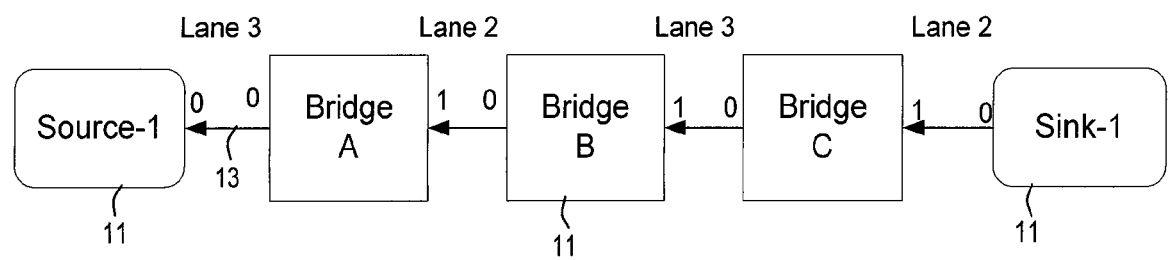
FIG. 3 shows isochronous data stream management for audio/video data communication by forwarding control messages from the sink AV device to the source AV device in the network of FIG. 2, according to an embodiment of the invention.

Similarly, when a control message traverses from device Sink-1 to device Source-1, the array of address fields may have different values corresponding to the network configuration shown in FIG. 3, using the array represented by Table 2 below, according to an embodiment of the invention.

TABLE 2

Array of Port and Lane Numbers

| Array Field 0 | | Array Field 1 | | Array Field 2 | | Array Field 3 | |
|---|---|---|---|---|---|---|---|
| Outbound Port | Lane number on the Port | Outbound Port | Lane number on the Port | Outbound Port | Lane number on the Port | Outbound Port | Lane number on the Port |
| 0 | 2 | 0 | 3 | 0 | 2 | 0 | 3 |

According to embodiments of the invention, the outbound port and lane number information can have different format than the arrays shown in Tables 1 and 2. For example, each array field may be a row of a matrix wherein the outbound ports and lane numbers become columns of the matrix. In this case the source device accesses the first row of the matrix, the next device accesses the second row of the matrix, and so on. A source device uses end-to-end information to populate the array fields, and each device on the multi-hop path accesses and modifies the array as needed.

In another embodiment, the forwarding table may have a default entry for lanes and port for outbound traffic. For example, within a port, default lanes are used for inbound and outbound traffic.

Option 2: Data/Control Message Forwarding Sub-Table

Figure 5A:
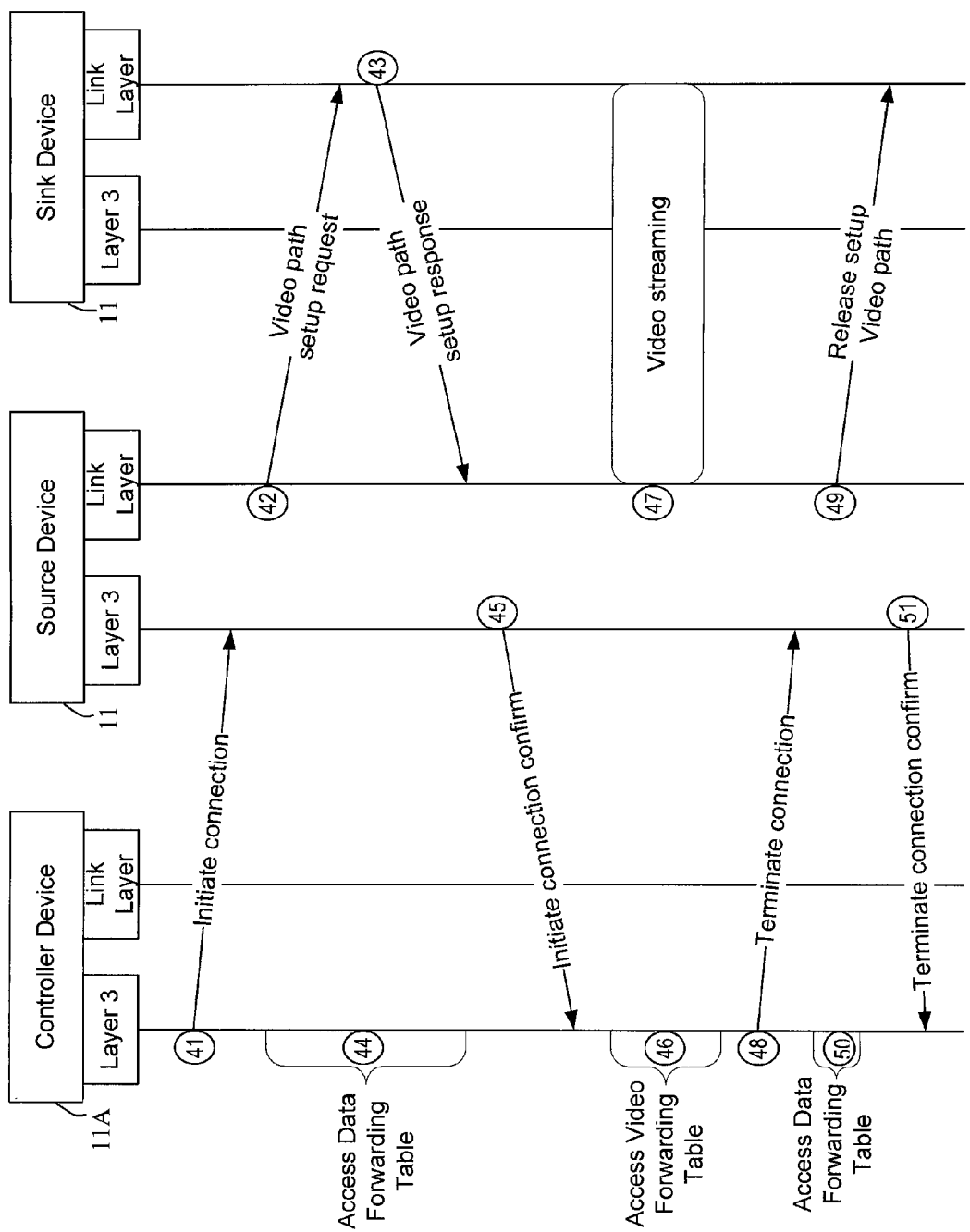
FIG. 5A illustrates a process for isochronous data stream management for audio/video data communication, according to an embodiment of the invention.
Figure 5B:
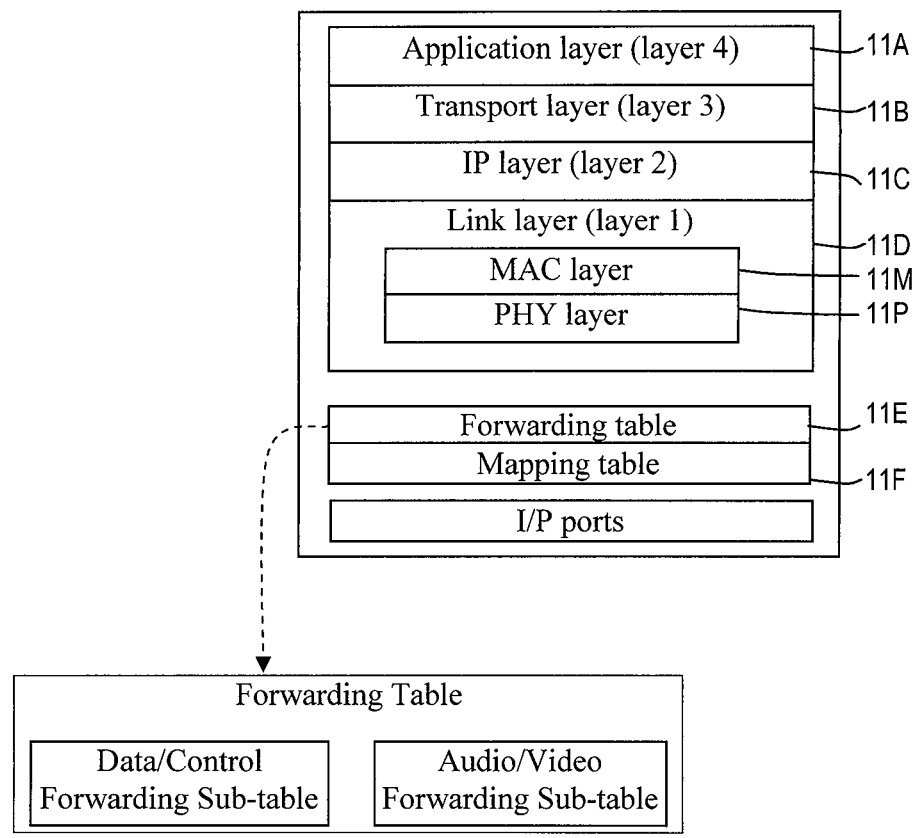
FIG. 5B shows a block diagram of an AV device isochronous data stream management for audio/video data communication, according to an embodiment of the invention.

According to Option 2 for data/control message forwarding, in one embodiment, each device in the AV network 20 includes a data/control forwarding sub-table as a sub-table of the forwarding table 11E (FIG. 5B). A device can access its data/control forwarding sub-table based on the destination of an incoming control message from an upstream device, determine on which port and lane the control message should be transmitted to a downstream (i.e., peer) device. According to an embodiment of the invention, the data/control forwarding sub-table at AV devices in FIGS. 2 and 3 may include entries such as shown by example in Tables 3-7 below. In one implementation, each AV device may share information with its upstream (i.e., peer) device to inform the incoming port and lane for the upstream device. In another implementation, fixed lanes may be used for transmission of control messages.

TABLE 3

Data/control Forwarding sub-table at Source-1

| Destination | Outbound Port | Lane number on the Port |
|---|---|---|
| All destinations | 0 | 0 |

TABLE 4

Data/control Forwarding sub-table at AV Bridge Device A

| Destination | Outbound Port | Lane number on the Port |
|---|---|---|
| Source-1 | 0 | 3 |
| B, C, Sink-1 | 1 | 1 |

TABLE 5

Data/control Forwarding sub-table at AV Bridge Device B

| Destination | Outbound Port | Lane number on the Port |
|---|---|---|
| Souce-1, A | 0 | 2 |
| C & Sink-1 | 1 | 0 |

TABLE 6

Data/control Forwarding sub-table at AV Bridge Device C

| Destination | Outbound Port | Lane number on the Port |
|---|---|---|
| Souce-1, A, B | 0 | 3 |
| Sink-1 | 1 | 1 |

TABLE 7

Data/control Forwarding sub-table at Sink-1

| Destination | Outbound Port | Lane number on the Port |
|---|---|---|
| All destinations | 0 | 2 |

Mapping Table

According to an embodiment of the invention, video data transmission involves end-to-end resource allocation (e.g., ports, lanes, communication link channel time) between a source device and a sink device. For example, in FIG. 2, Source-1 to Sink-1 video data transmission requires allocation of ports, lanes, and channel time. The various ports and lanes may be dynamically configured, such that the resource allocation enables configuration of lanes in terms of T and R modes described above. Moreover, the channel time on a lane may be multiplexed among multiple streams. In this way, the channel time on each lane can be shared among multiple streams.

Figure 4B:
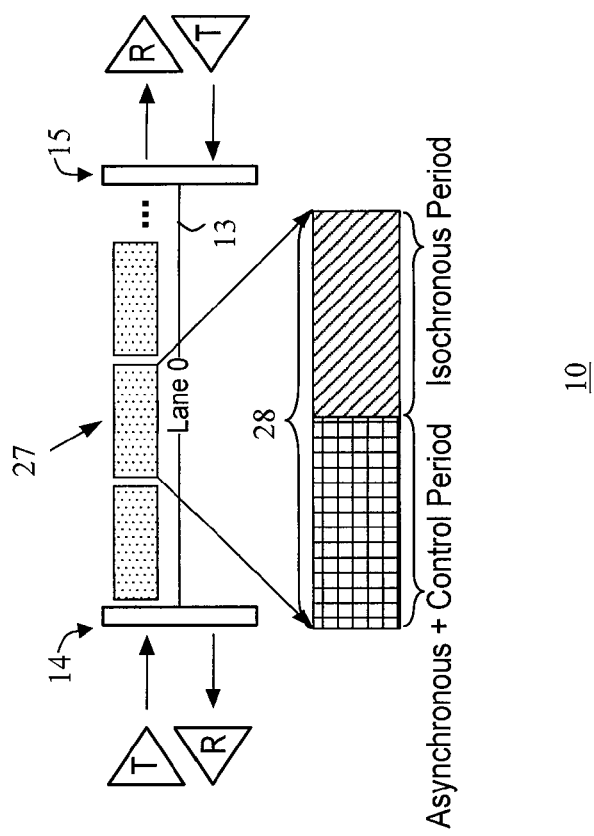
FIGS. 4A-4B show allocation of communication channel time for isochronous data stream management for audio/video data communication, according to an embodiment of the invention.
Figure 4A:
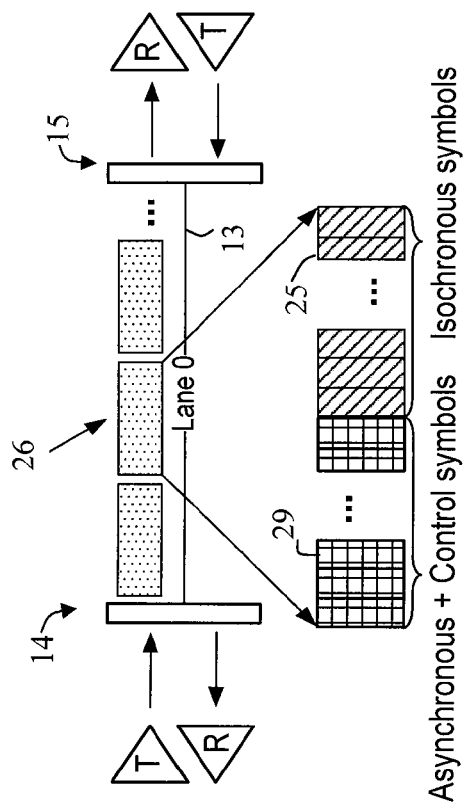

Referring to FIG. 4A, according to an embodiment of the invention, channel time may be divided into units for transmission of multiple fixed length packets. In such a case, channel time is allocated in terms of asynchronous control symbols 29, and isochronous symbols 25 within such fixed length packets 26 (e.g., transport packets), for isochronous channel time. FIG. 4A shows the case of channel time for isochronous streams in terms of symbols 25 within a transport packet. According to an embodiment of the invention, channel time may be represented as a contiguous contention free period 28 on the channel, as shown by example in FIG. 4B, illustrating isochronous channel time allocation. FIG. 4B shows superframe based time allocation, wherein each superframe 27 that occurs on a periodic basis, includes contention free periods 28. Each period 28 comprises an asynchronous control period and an isochronous period. Only activity on Lane 0 is illustrated in FIGS. 4A-4B, however, other lanes existing on a port may follow the same implementation.

According to an embodiment of the invention, in an AV network the source device 11 (e.g., Source-1) is preferred to initiate a video path setup request (control message) as it has accurate information about the bandwidth requirement of an isochronous stream. The video path setup request includes a stream or sequence number to distinguish different video path setup requests generated by the source device. In one embodiment, the stream or sequence number may be maintained as a 16-bit or 32-bit counter in the source device such that each new video path setup request initiated by the source device has a different value. Each AV device 11 in the video network maintains the stream index that can be represented as a combination of {Source address, Destination address, MAC address of the device initiating the video-path-setup request, and stream number or sequence number}, wherein MAC comprises medium access control information. Based on these values, each AV device 11 can distinguish between different stream indices. The stream index is a local variable in each AV device that is not shared with other AV devices in the AV network. According to an embodiment of the invention, a mapping table 11F (FIG. 5B) may be used for maintaining the stream index, as shown by example Table 8 below.

TABLE 8

Mapping Table

| | Isochronous Stream Details (from the control message) | | | |
|---|---|---|---|---|
| Stream Index | Source Address | Destination Address | MAC address of the device initiated the video_path_setup_Request | Sequence number or stream number |
| a | X | Y | X | n |
| b | U | R | R | k |
| ... | ... | ... | ... | ... |

Further, as shown by the example Table 9 below, a mapping table for an AV device (i.e., devices 11 in FIG. 2) may have entries based on Source-1 initiating a video-path-setup request and setting the sequence or stream number field set to S.

TABLE 9

Mapping Table

| | Isochronous Stream Details (from the control message) | | | |
|---|---|---|---|---|
| Stream Index | Source Address | Destination Address | MAC address of the device initiated the video_path_setup_Request | Sequence number or stream number |
| 0 | Source-1 | Sink-1 | Source-1 | S |

Video Forwarding Sub-Table

According to an embodiment of the invention, a video forwarding sub-table at each AV device includes information for forwarding of uncompressed audio/video data messages (packets) between AV devices in the AV network. Example video forwarding sub-tables 10-13 below illustrate allocated resources at various AV devices in the network shown in FIG. 2. For illustration purposes it is assumed that embodiments of the invention make use of symbol based bandwidth allocation as in FIG. 4A.

TABLE 10

Video Forwarding sub-table indicating resource allocation at Source-1

| Stream Index | Outbound Port | Lane number on the Port | Allocated TU |
|---|---|---|---|
| i | 0 | 0 | Symbols j 1 ... N symbols are free for allocations, j, k, m < N |
| | | 2 | Symbols k |

TABLE 11

Video Forwarding sub-table indicating resource allocation at AV Bridge Device A

| Stream Index | Outbound Port | Lane number on the Port | Allocated TU |
|---|---|---|---|
| i | 1 | 1 | Symbols j |
|   |   | 3 | Symbols k |

TABLE 13

Video Forwarding sub-table indicating resource allocation at AV Bridge Device B

| Stream Index | Outbound Port | Lane number on the Port | Allocated TU |
|---|---|---|---|
| i | 0 | 0 | Symbols j |
|   |   | 2 | Symbols k |

TABLE 13

Video Forwarding sub-table indicating resource allocation at AV Bridge Device C

| Stream Index | Outbound Port | Lane number on the Port | Allocated TU |
|---|---|---|---|
| i | 1 | 0 | Symbols m |

Similarly, other AV devices on the video path between Source-1 and Sink-1 maintain inbound information in the video forwarding sub-table.

FIG. 5A illustrates an AV network including an AV device, a sink AV device, and a controller module/device. According to embodiments of the invention, the controller module/device may be a separate AV device (as shown), or a maybe a component of one of the AV devices (such as the source device or the sink device). In one embodiment, an AV device may comprise a consumer electronic device, a personal computer, a mobile device, etc., referred herein collectively as an AV device. Each such AV device may comprise one or more of: a communication module, processor, memory, input/output ports, display monitor, user interface, etc. The AV devices may be connected via a network of wired communication links comprising (physical) lanes selectively connected between ports of the devices.

Referring to the block diagram in FIG. 5B, one embodiment an AV device (e.g., AV devices 11) comprises an Application Layer (layer 4) 11A, a Transport or TCP Layer (layer 3) 11B, an IP Layer or Network/Internet Layer (layer 2) 11C, and a Link Layer comprising physical and data link sub-layers (layer 1) 11D. These layers are similar to TCP/IP layers and can be loosely mapped to the Open System Architecture (OSI). The data link sub-layer of the link layer includes a MAC layer 11M and a PHY layer 11P, configured for communication over an AV wired network, according to embodiments of the invention.

FIG. 5A further illustrates a video stream path setup process according to an embodiment of the invention. In process block 41, isochronous video stream connection set up begins when a stream controller device 11A transmits an Initiate connection control message that may be transmitted over layer 3 (FIG. 5B). Upon receiving the Initiate connection control message, in process block 42 a Source device in turn sends a Video path setup request control message to a sink device. Video path setup related control messages include various fields such as: {source address, destination address, Sequence number/stream number, Request Bandwidth Request, Time To Live (TTL), etc.}. In process block 43, the Sink device sends a Video path setup response control message to the Source device. The response indicates if the video path setup request is successful and the reason if the video path setup request failed. In process block 44, the controller device accesses a data/control forwarding sub-table (FIG. 5B) to determine forwarding information for the control message. In process block 45 the Source device sends an Initiate connection confirmation control message to the controller device.

Once a video stream is established, in process block 46 a video forwarding sub-table is accessed for switching and forwarding of uncompressed video data. In process block 47, each AV device can appropriately forward received video data on a corresponding port and lane to its downstream device. In one embodiment, the uncompressed video frames do not contain source and destination addresses such that the received video data is correctly forwarded on the downstream port based on the video forwarding sub-table. The video forwarding sub-table entries remain valid until a video-path setup control message with the matching sequence number is received to delete the allocation.

In process block 48, the controller device terminates the connection by sending a Terminate connection control message on layer 3 (FIG. 5B), that is followed in process block 49 by a layer 2 (FIG. 5B). Release setup video path control message from the Source device to release the allocated resources for the video stream. In process block 50 a data/control forwarding sub-table is accessed to determine forwarding of the control message and in process block 51 the source device sends a Terminate connection confirmation control message to the controller device. In one embodiment, the data/control forwarding sub-tables (e.g., Tables 3-7 above) are used to determine the outbound port and lanes based on the destination address in the control messages for forwarding control messages.

Figure 6A:
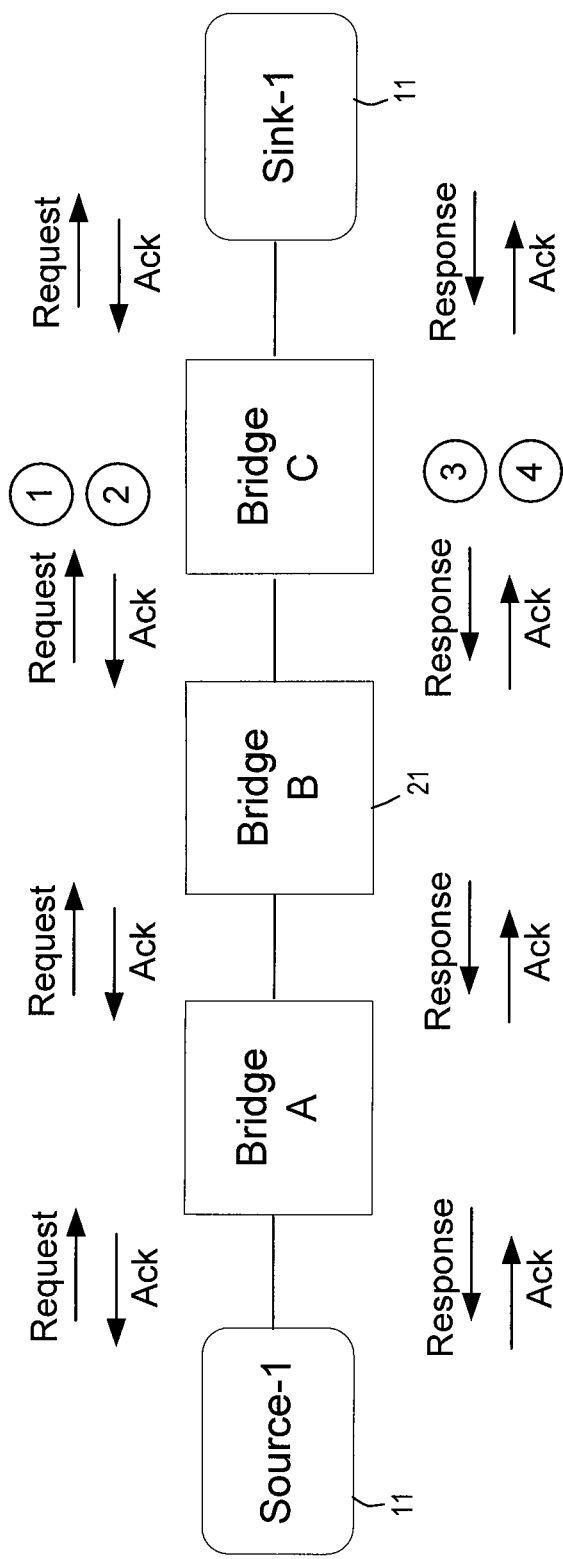
FIG. 6A shows a block diagram of a network of AV devices including a source AV device, one or more bridge AV devices and a destination AV device, implementing isochronous data stream management for audio/video data communication by forwarding control messages from the source AV device to the sink (destination) AV device, according to an embodiment of the invention.

FIG. 6A shows an example video path setup request and response control message sequence in the AV network 20 based on the above process 40 for video transmission from Source-1 to Sink-1, according to an embodiment of the invention. As shown in FIG. 6A, before a forwarding AV device (e.g., Bridge B) forwards a video path setup request control message from an upstream (previous hop) AV device (e.g., Bridge A) to a downstream (next hop) AV device (e.g., Bridge C), the forwarding AV device determines if a requested video transmission bandwidth can be satisfied. If the requested bandwidth can satisfied, then the forwarding AV device sends an acknowledgment (Ack) control message to the upstream AV device. Otherwise, the forwarding AV device sends a Nack (i.e., not Ack) control message to its upstream AV device that eventually reaches the source device (e.g., Source-1), as illustrated in FIG. 6A. The Nack message may optionally include an alternative suggested bandwidth that is lower than the originally requested one.

Once the request control message successfully reaches the destination device (e.g., Sink-1), a response control message is transmitted back to the source device. The response message is forwarded hop-by-hop starting from the destination device, as illustrated in FIG. 6A. In one example, Source-1 that initiates a video-path setup request control command and Sink-1 is the device that initiates the video-path setup response control command. AV bridges devices A, B, and C participate in forwarding the setup request and response control messages. On each AV device, the response message is replied with an Ack message that includes the outbound port resource allocation on the AV device that transmitted the Ack message.

The AV device that transmitted the video setup response control message upon receiving the resource allocation embedded in the Ack response control message, updates its video forwarding sub-table for both inbound and outbound ports related to the video stream. As discussed above, the stream index field is not shared with a peer AV device and instead the detailed mapping fields such as {Source address and Destination address, (address of the device that initiated the video-path-setup request & sequence/stream number)} are used. FIG. 6A illustrates the sequence of control messages 1, 2, 3, and 4 between devices B and C when both the request and response control messages are successful.

Figure 6B:
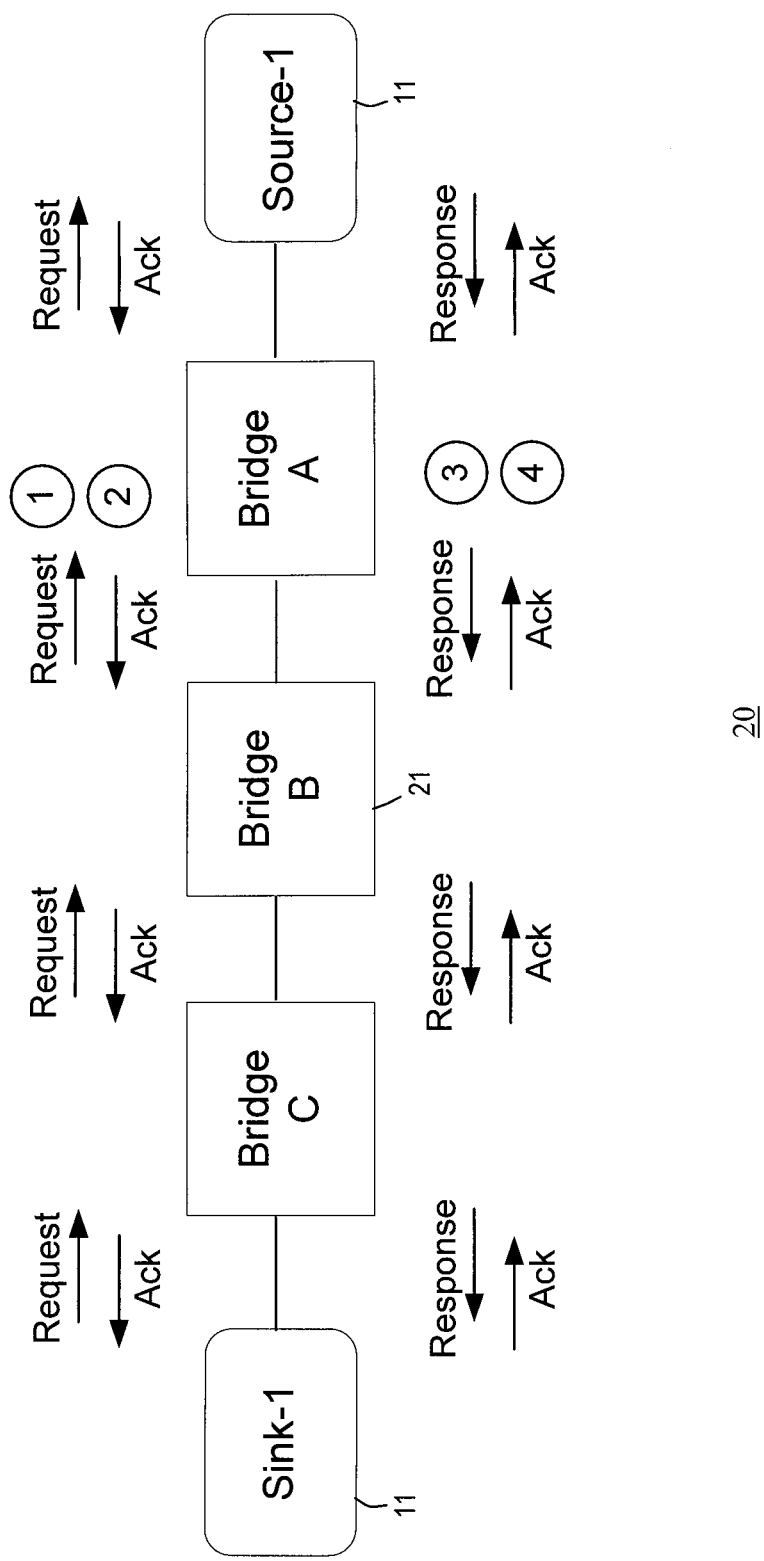
FIG. 6B shows isochronous data stream management for audio/video data communication by forwarding control messages from the sink AV device to the source AV device in the network of FIG. 6A, according to an embodiment of the invention.

Similarly, FIG. 6B shows an example video path setup request and response control message sequence in the AV network 20 based on the above process 40 for video transmission from Sink-1 to Source-1, according to an embodiment of the invention. As such, FIGS. 6A-6B illustrate bi-directional video transmission between source and sink AV devices according to embodiments of the invention.

Figure 7:
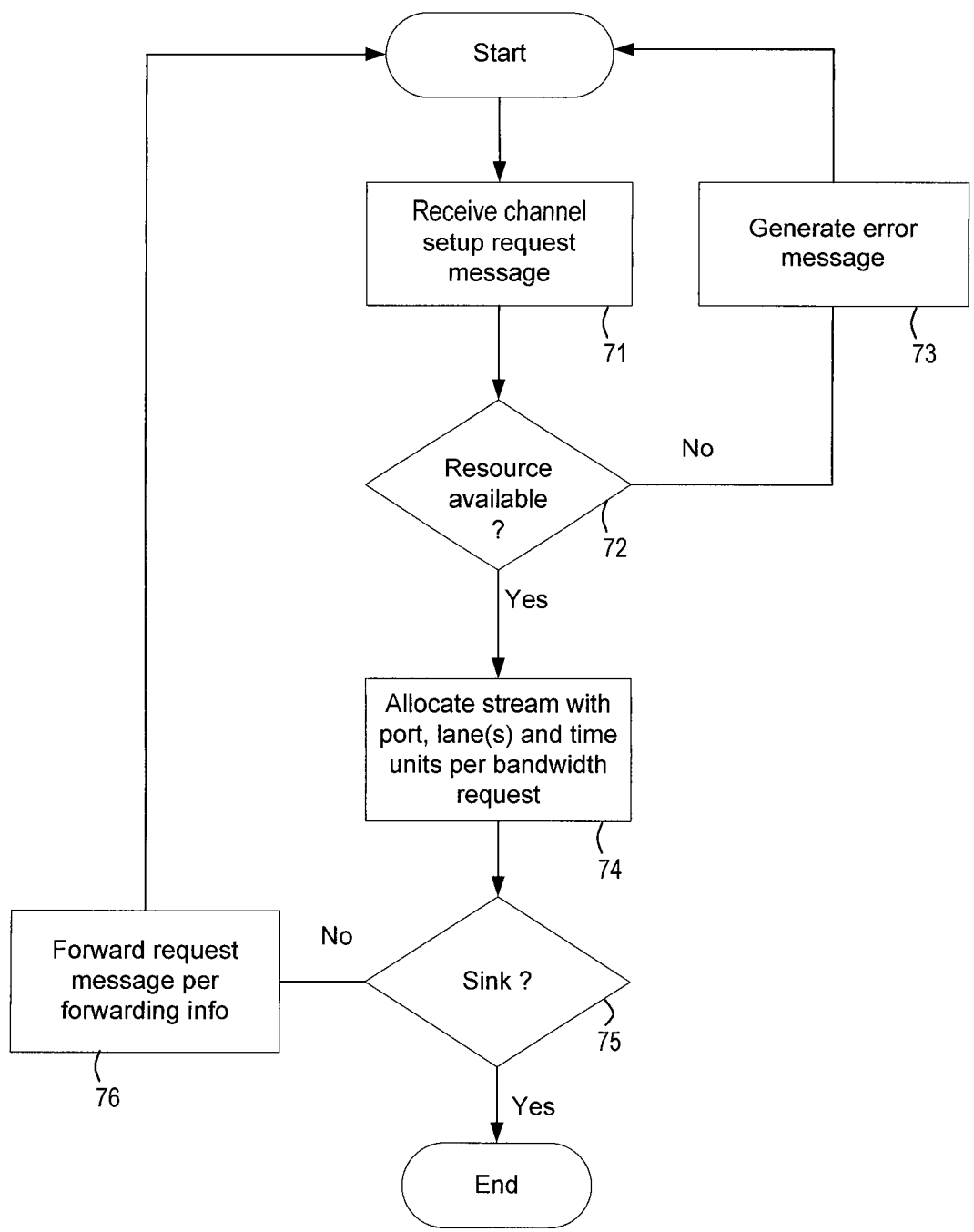
FIG. 7 shows a video stream path setup request process in an AV network implementing isochronous data stream management for audio/video data communication, according to an embodiment of the invention.
Figure 8:
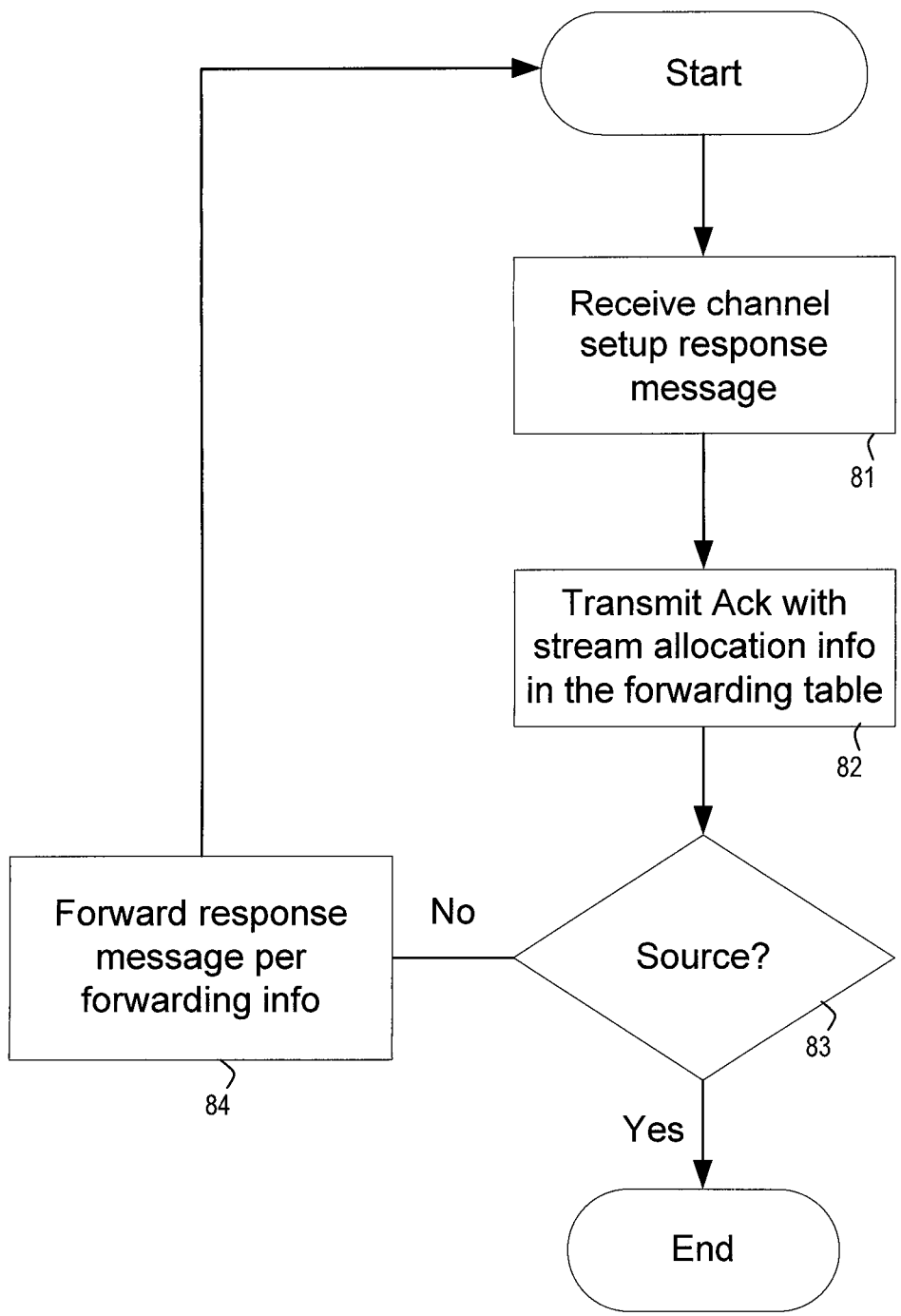
FIG. 8 shows a video stream path setup response process in an AV network implementing isochronous data stream management for audio/video data communication, according to an embodiment of the invention.

Referring to processes in FIGS. 7-8, a video stream path from a source AV device to a destination (sink) AV device is established via the lanes 13 between the AV devices in the AV network, according to an embodiment of the invention. FIG. 7 shows a video stream path setup request process 70 in an AV network, according to an embodiment of the invention. In process block 71, a request control message comprising a channel setup request to setup an AV stream is received from an upstream AV device. In process block 72, it is determined if resources (e.g., port, lane(s) time units per the bandwidth request) to satisfy a requested stream bandwidth are available. If sufficient resources are not available, in process block 73 a response error message is generated and the process proceeds to block 71. If sufficient resources are available, in process block 74 resources are allocated. In process block 75, if the recipient of the channel setup request control message is a destination (sink) AV device, then the process terminates, otherwise in process block 76 the request control message is forwarded to a downstream AV device using data/control forwarding sub-table information. A video stream path setup response process corresponding to the above video stream path setup request process is described below.

FIG. 8 shows a video stream path setup response process 80 in an AV network, according to an embodiment of the invention. In process block 81, a channel setup response control message is generated in response to a video path setup request control message received from an upstream AV device. In process block 82, an Ack control message including video stream allocation information from a data/control forwarding sub-table is transmitted to the upstream AV device. In process block 83, if the receiving AV device is a source AV device, the process terminates. Otherwise, in process block 84, the response control message is sequentially forwarded to upstream AV devices in the video stream path based on forwarding information in respective data/control forwarding sub-table of each AV device in the path.

As such, a video stream path from a source AV device to a destination (sink) AV device is established via the lanes 13 between the AV devices in the AV network, according to an embodiment of the invention. According to the embodiments of the invention, the video streaming processes described herein include transmission of not only video data, but also audio data along with the video data. Embodiments of isochronous data stream management (such as processes described above in relation to in FIGS. 2-5A and FIGS. 6-8), may be implemented as data stream management modules in the MAC layers of the AV devices 11, according to embodiments of the invention.

Embodiments of the invention provide a method and system for establishing a video path that is bi-directional between physical ports of two AV devices, wherein AV data can travel bi-directionally (i.e., in opposite directions) on a communication link between two AV devices for isochronous data stream management in AV networks.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters, receivers, transceivers in wireless networks, etc. Further, embodiments of the invention can take the form of an entirely hardware embodiment, an entirely software embodiment or an embodiment containing both hardware and software elements.

Figure 9:
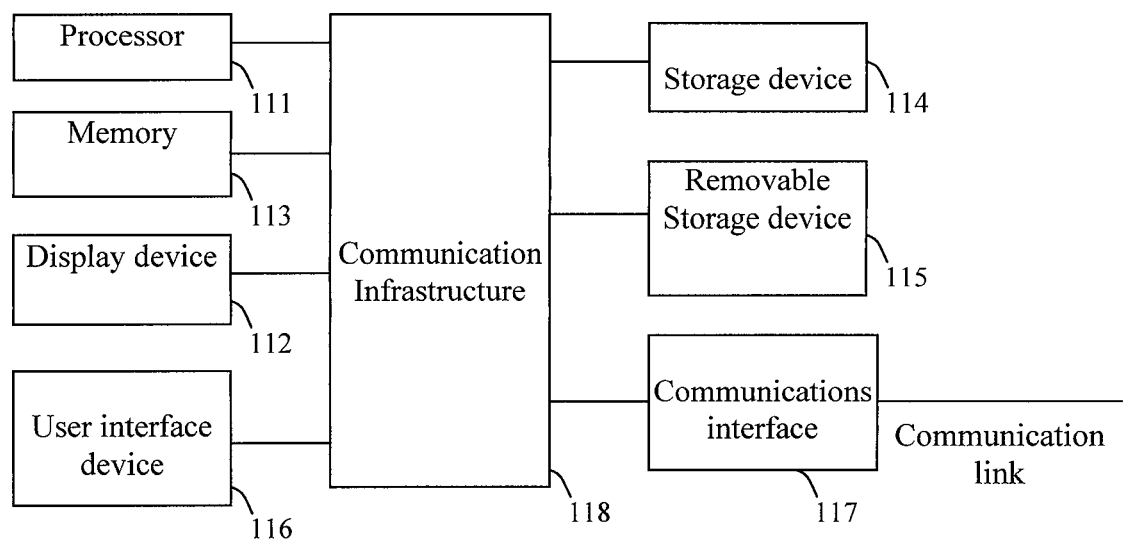
FIG. 9 is a high level block diagram showing an information processing system comprising a computer system useful for implementing an embodiment of the invention.

FIG. 9 is a high level block diagram showing an information processing system comprising a computer system 100 useful for implementing an embodiment of the present invention. The computer system 100 includes one or more processors 111, and can further include an electronic display device 112 (for displaying graphics, text, and other data), a main memory 113 (e.g., random access memory (RAM)), storage device 114 (e.g., hard disk drive), removable storage device 115 (e.g., removable storage drive, removable memory module, a magnetic tape drive, optical disk drive, computer readable medium having stored therein computer software and/or data), user interface device 116 (e.g., keyboard, touch screen, keypad, pointing device), and a communication interface 117 (e.g., modem, a network interface (such as an Ethernet card), a communications port, or a PCMCIA slot and card). The communication interface 117 allows software and data to be transferred between the computer system and external devices. The system 100 further includes a communications infrastructure 118 (e.g., a communications bus, cross-over bar, or network) to which the aforementioned devices/modules 11 through 17 are connected.

Information transferred via communications interface 117 may be in the form of signals such as electronic, electromagnetic, optical, or other signals capable of being received by communications interface 117, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments of the present invention have been described with reference to flowchart illustrations and/or block diagrams of methods, apparatus (systems) and computer program products according to embodiments of the invention. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing embodiments of the present invention. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer programs (i.e., computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor and/or multi-core processor to perform the features of the computer system. Such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of isochronous communication management between audio/video (AV) devices, comprising:
maintaining forwarding information including dynamic lane information for forwarding data between AV devices, wherein each AV device includes multiple input/output (I/O) ports each including multiple communication lanes for connecting an AV device to another AV device via a communication link, wherein the multiple communication lanes are selectively assigned;
using the forwarding information to communicate AV path set-up request and response control messages between a source AV device and a destination AV device via said communication link, to establish AV path streams for bi-directional isochronous AV data streaming between the source AV device and the destination AV device, wherein a portion of the multiple communication lanes are selectively used for AV data communication in one direction and a remaining portion of the multiple communication lanes are enabled for AV data communication in a different direction; and
streaming isochronous AV data in a switched network of the AV devices using the forwarding information.

2. The method of claim 1, wherein:
maintaining forwarding information comprises maintaining a forwarding table that includes the dynamic lane information; and
using the forwarding information to communicate AV path set-up request and response control messages comprises accessing the forwarding table for communicating AV path set-up request and response control messages between the source AV device and the destination AV device via said communication link.

3. The method of claim 2, further comprising:
in response to an incoming message arriving at a bridge AV device, accessing the forwarding table to determine an outbound port, and a lane number on the outbound port, of the AV device for forwarding the incoming message for delivery to the destination AV device; and
forwarding AV path set-up request and response control messages between the source AV device and the destination AV device via said outbound port, and a lane number.

4. The method of claim 3, wherein:
the forwarding table includes a control message forwarding sub-table and an audio/video forwarding sub-table;
accessing the forwarding table includes accessing the control forwarding sub-table based on the destination of an incoming control message to determine an outbound port, and a lane number on the outbound port, of the bridge AV device for forwarding the incoming control message for delivery to the destination AV device;
accessing the forwarding table further includes accessing the audio/video forwarding sub-table for allocating isochronous communication resources for AV data streaming; and
the forwarding table is dynamically updated based on incoming control messages.

5. The method of claim 4, further comprising:
in response to an AV path set-up control message, allocating isochronous communication resources for AV data communication between the source AV device and the destination AV device using the audio/video forwarding sub-table.

6. The method of claim 5, wherein:
allocating isochronous communication resources comprises selecting: at least one lane, data flow direction, and channel time duration on each selected lane.

7. The method of claim 6, further comprising:
tracking the isochronous communication resources in the audio/video forwarding sub-table.

8. The method of claim 7, wherein:
accessing the forwarding table includes accessing the audio/video forwarding sub-table for allocating isochronous communication resources for isochronous communication of AV data between the source AV device and the destination AV device via one or more bridge AV devices.

9. The method of claim 8, further comprising:
maintaining a forwarding table for each AV device.

10. The method of claim 1, wherein maintaining forwarding information for forwarding data between AV devices comprises:
each incoming control message including an outbound port number, and a lane number on the outbound port, for a bridge AV device to forward the incoming control message for delivery to the destination AV device; and forwarding AV path set-up request and response control messages between the source AV device and the destination AV device via said outbound port, and a lane number.

11. The method of claim 10, further comprising:
in response to an AV path set-up control message, allocating isochronous communication resources for AV data communication between the source AV device and the destination AV device.

12. The method of claim 11, further comprising:
for each AV device, maintaining forwarding information on port and lane number for forwarding AV path set-up request and response control messages.

13. The method of claim 12, further comprising:
for each AV device, maintaining a table of isochronous communication resource allocations including information about AV path stream, port number, lane number, and channel time duration for allocated communication lanes.

14. The method of claim 1, further comprising:
using the forwarding information to communicate AV path set-up request and response control messages between the destination AV device and the source AV device via said communication link, thereby enabling bi-directional AV control message communication between the source and destination AV devices.

15. The method of claim 14, further comprising:
using the forwarding information to communicate AV data packets between the destination AV device and the source AV device via said communication link;
using the forwarding information to communicate AV data packets between the source AV device and the destination AV device via said communication link;
thereby enabling bi-directional AV data packet communication between the source AV device and the destination AV device.

16. The method of claim 5, wherein:
allocating isochronous communication resources comprises selecting: at least one lane and data flow direction on each selected lane.

17. The method of claim 5, wherein:
allocating isochronous communication resources comprises selecting: at least one lane and channel time duration on each selected lane.

18. The method of claim 1, wherein allocating isochronous communication resources comprises reserving: ports, communication lanes and allocated channel time duration on corresponding communication lanes.

19. The method of claim 1, wherein a particular I/O port and communication lane for forwarding a received control message are dynamically selected from the multiple I/O ports and the multiple communication lanes, wherein a dedicated communication lane is not required for exchange of control messages and data.

20. The method of claim 2, wherein the forwarding table comprises table entries for a particular destination device in a tuple form comprising (port, lane) for dynamically assigning a selected I/O port and communication lane.

21. The method of claim 1, wherein the multiple communication lanes are dynamically assigned for either a transmit mode or a receive mode, and simultaneous transmission of AV data between the source and destination AV devices is enabled.

22. The method of claim 2, wherein for a destination AV device without an entry in the forwarding table, a received frame is forwarded on all other ports except an incoming port.

23. The method of claim 2, wherein each entry in the forwarding table comprises a time duration for aging entries and for deleting entries.

24. The method of claim 1, wherein the forwarding information is used for communicating AV path set-up request and response control messages between a source AV device and a destination AV device.

25. An audio/video (AV) device, comprising:
a stream management module that uses forwarding information including dynamic lane information to communicate AV path set-up request and response control messages between, the AV device and a peer AV device connected via a communication link, wherein the AV device includes multiple input/output (I/O) ports including multiple communication lanes for connecting the AV device to the peer AV device via the communication link, wherein the multiple communication lanes are selectively assigned; and
a physical layer for communicating data between the AV device and the peer AV device;
wherein the stream management module uses the forwarding information to establish AV path streams for isochronous AV data streaming between a source AV device and a destination AV device, and to stream isochronous AV data between the source AV device and the destination AV device in a switched network of AV devices, wherein a portion of the multiple communication lanes are selectively used for AV data communication in one direction and a remaining portion of the multiple communication lanes are enabled for AV data communication in a different direction.

26. The AV device of claim 25, wherein the AV data comprises uncompressed video information and audio information.

27. The AV device of claim 25, further comprising:
a forwarding table comprising said forwarding information;
wherein in response to an incoming message arriving at the AV device, the stream management module accesses the forwarding information to determine an outbound port and a lane number on the outbound port, of the AV device for forwarding the incoming message for delivery to the destination AV device, to forward AV path set-up request and response control messages between the source AV device and the destination AV device via said outbound port, and a lane number.

28. The AV device of claim 27, wherein:
the forwarding table includes a control message forwarding sub-table and an audio/video forwarding sub-table;
the stream management module accesses the control forwarding sub-table based on the destination of an incoming control message to determine an outbound port, and a lane number on the outbound port, of the AV device to forward the incoming control message for delivery to the destination AV device;
the stream management module accesses the audio/video forwarding sub-table to allocate isochronous communication resources for AV data streaming; and
the stream management module dynamically updates the forwarding table based on incoming control messages.

29. The AV device of claim 28, wherein:
in response to an AV path set-up control message, the stream management module accesses the audio/video forwarding sub-table to allocate isochronous communication resources at the AV device for AV data communication between the source AV device and the destination AV device.

30. The AV device of claim 29, wherein:
the stream management module allocates isochronous communication resources by selecting: at least one lane, data flow direction, and channel time duration on each selected lane.

31. The AV device of claim 30, wherein:
the stream management module tracks the isochronous communication resources in the audio/video forwarding sub-table.

32. The AV device of claim 31, wherein:
the stream management module accesses the audio/video forwarding sub-table for allocating isochronous communication resources for isochronous communication of AV data between the source AV device and the destination AV device via the AV device.

33. The AV device of claim 25, wherein the incoming control messages include said forwarding information.

34. The AV device of claim 33, wherein:
in response to an AV path set-up control message, the stream management module allocates isochronous communication resources for AV data communication between the source AV device and the destination AV device.

35. The AV device of claim 34, wherein:
the stream management module maintains forwarding information on port and lane number to forward AV path set-up request and response control messages, and to establish AV path streams for isochronous AV data streaming.

36. The AV device of claim 35, wherein:
the stream management module maintains a table of isochronous communication resource allocations including information about AV path stream, port number, lane number, and channel time duration for allocated communication lanes.

37. The AV device of claim 25, wherein:
the stream management module using the forwarding information to communicate AV path set-up request and response control messages between the destination AV device and the source AV device via said communication link, wherein bi-directional AV control message communication between the source and destination AV devices is enabled.

38. The AV device of claim 37, wherein:
the stream management module uses the forwarding information to communicate AV data packets between the destination AV device and the source AV device via said communication link; and
the stream management module uses the forwarding information to communicate AV data packets between the source AV device and the destination AV device via said communication link;
thereby enabling bi-directional AV data packet communication between the source AV device and the destination AV device.

39. An audio/video (AV) stream management system, comprising:
a switched network of AV devices serially connected via communication links;
wherein at least one of said AV devices comprises:
a stream management module that uses forwarding information including dynamic lane information to communicate AV path set-up request and response control messages between said AV device and a peer AV device connected via a communication link, wherein each AV device includes multiple input/output (I/O) ports including multiple communication lanes for connecting the AV device to a peer AV device via the communication link, wherein the multiple communication lanes are selectively assigned; and
a physical layer for communicating data between said AV device and the peer AV device;
wherein the stream management module uses the forwarding information to establish AV path streams for isochronous AV data streaming between a source AV device and a destination AV device, and to stream isochronous AV data between the source AV device and the destination AV device in a switched network of said AV devices, wherein a portion of the multiple communication lanes are selectively used for AV data communication in one direction and a remaining portion of the multiple communication lanes are enabled for AV data communication in a different direction.

40. The system of claim 39, wherein said at least one AV device comprises a switched bridge AV device serially connected between the source AV device and the destination AV device.

41. The system of claim 40, wherein:
in response to an incoming message arriving at the bridge AV device, the stream management module accesses said forwarding information stored in a forwarding table in the bridge AV device, to determine an outbound port, and a lane number on the outbound port, of the bridge AV device for forwarding the incoming message for delivery to the destination AV device, to forward AV path set-up request and response control messages between the source AV device and the destination AV device via said outbound port, and a lane number.

42. The system of claim 41, wherein:
the forwarding table includes a control message forwarding sub-table and an audio/video forwarding sub-table that is dynamically updated based on control messages;
the stream management module accesses the control forwarding sub-table based on the destination of an incoming control message to determine an outbound port, and a lane number on the outbound port, of the bridge AV device to forward the incoming control message for delivery to the destination AV device;
the stream management module accesses the audio/video forwarding sub-table to allocate isochronous communication resources for AV data streaming; and
the stream management module dynamically updates the forwarding table based on incoming control messages.

43. The system of claim 42, wherein:
in response to an AV path set-up control message, the stream management module accesses the audio/video forwarding sub-table to allocate isochronous communication resources at the ridge AV device for AV data communication between the source AV device and the destination AV device.

44. The system of claim 43, wherein:
the stream management module allocates isochronous communication resources by selecting: at least one lane, data flow direction, and channel time duration on each selected lane.

45. The system of claim 44, wherein:
the stream management module tracks the isochronous communication resources in the audio/video forwarding sub-table.

46. The system of claim 45, wherein:
the stream management module accesses the audio/video forwarding sub-table for allocating isochronous communication resources for isochronous communication of AV data between the source AV device and the destination AV device via the bride AV device.

47. The system of claim 40, wherein the incoming control messages include said forwarding information.

48. The system of claim 47, wherein:
in response to an AV path set-up control message, the stream management module allocates isochronous communication resources for AV data communication between the source AV device and the destination AV device.

49. The system of claim 48, wherein:
the stream management module maintains forwarding information on port and lane number to forward AV path set-up request and response control messages, and to establish AV path streams for isochronous AV data streaming.

50. The system of claim 49, wherein:
the stream management module maintains a table of isochronous communication resource allocations including information about AV path stream, port number, lane number, and channel time duration for allocated communication lanes.

51. The system of claim 39, wherein:
the stream management module using the forwarding information to communicate AV path set-up request and response control messages between the destination AV device and the source AV device via said communication link, thereby enabling bi-directional AV control message communication between the source and destination AV devices.

52. The system of claim 51, wherein:
the stream management module uses the forwarding information to communicate AV data packets between the destination AV device and the source AV device via said communication link; and
the stream management module uses the forwarding information to communicate AV data packets between the source AV device and the destination AV device via said communication link;
thereby enabling bi-directional AV data packet communication between the source AV device and the destination AV device.

* * * * *